Figure 1:
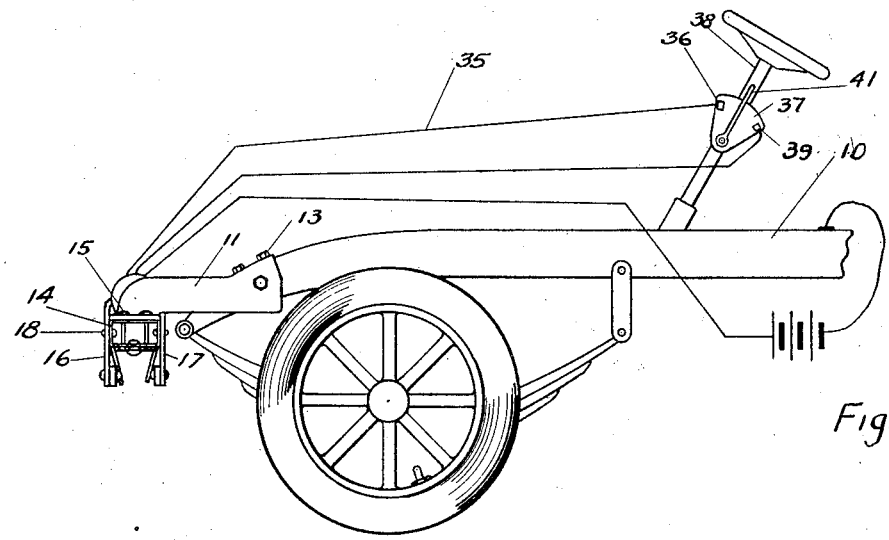
Figure 2:
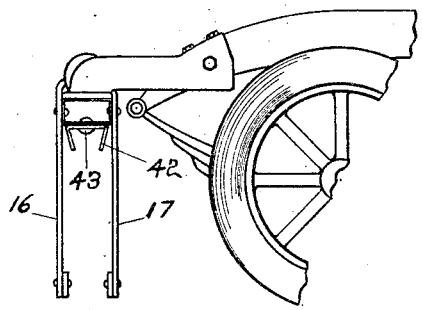

Dec. 16, 1924.

R. S. BLAIR

FENDER FOR VEHICLES

Filed April 11, 1921  2 Sheets-Sheet 1

1,519,233

INVENTOR

Robert S. Blair

Dec. 16, 1924.
R. S. BLAIR
FENDER FOR VEHICLES
Filed April 11, 1921  2 Sheets-Sheet 2
1,519,233
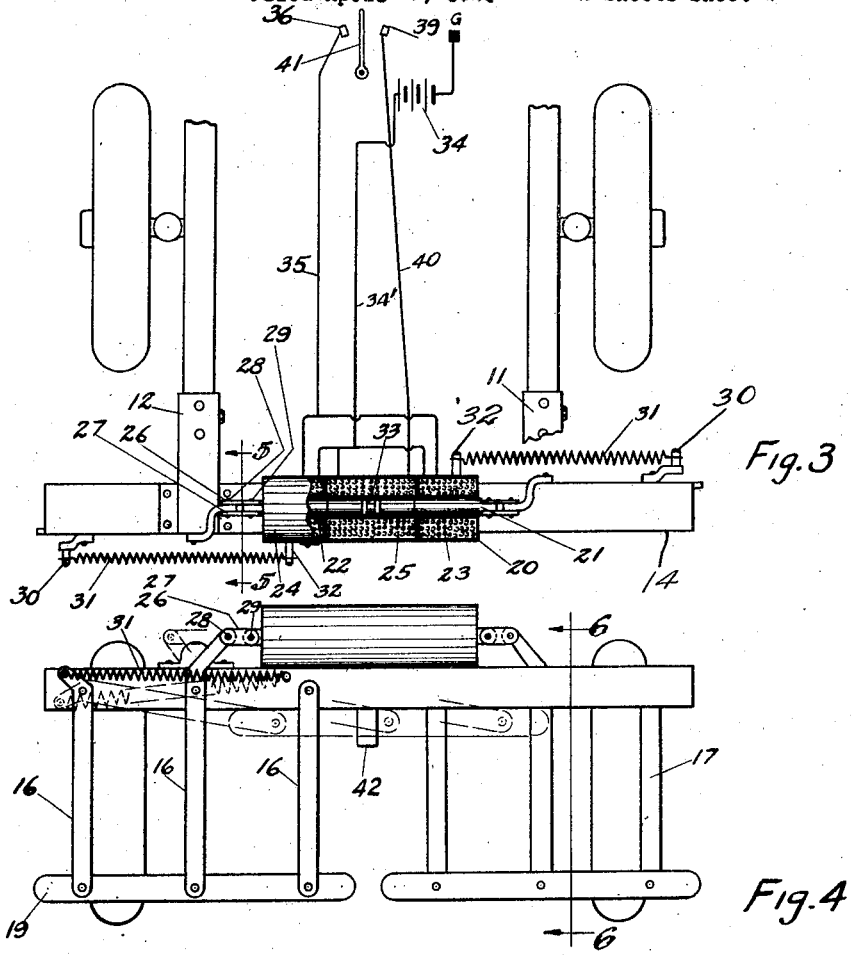
Fig. 3
Fig. 4
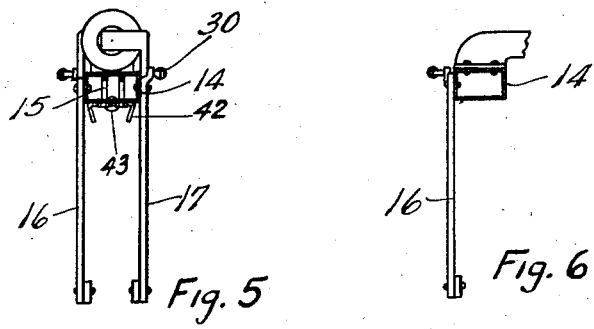
Fig. 5
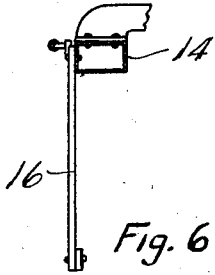
Fig. 6
INVENTOR
Robert S. Blair Patented Dec. 16, 1924.

1,519,233

UNITED STATES PATENT OFFICE.

ROBERT S. BLAIR, OF SOUND BEACH, CONNECTICUT.

FENDER FOR VEHICLES.

Application filed April 11, 1921. Serial No. 460,246.

*To all whom it may concern:*

Be it known that I, ROBERT S. BLAIR, a citizen of the United States, and resident of Sound Beach, in the county of Fairfield and State of Connecticut, have invented certain new and useful Improvements in Fenders for Vehicles, of which the following is a specification.

This invention relates to fenders for vehicles and with regard to certain features more particularly to motor vehicles.

One of the objects thereof is to provide a fender of simple and practical construction and efficient in operation. Another object is to provide a fender which is silent in operation at all times. Another object is to provide a fender not easily rendered inactive by mud or the elements. Another object is to provide a fender which can be quickly and efficiently operated by the average vehicle operator. Another object is to provide a fender which can be readily attached by the average mechanic to any of the existing standard vehicles. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawings in which is shown one of the various possible embodiments of this invention, Figure I is a diagrammatic side elevation of the forward part of a motor vehicle having attached to the forward part of the frame, a fender.

Figure II is a diagrammatic side elevation of the extreme forward portion of the frame and wheel of the vehicle shown in Figure I but with the fender in an extended position.

Figure III is a plan view of the forward part of the vehicle shown in Figure I showing the fender attached to the forward part of the frame with a part of the actuating solenoid broken away showing the internal construction thereof.

Figure IV is a front elevation of Figure III showing the fender in an extended position.

Figure V is a cross section taken along the line 5—5 in Figure III in the direction as indicated by the arrows.

Figure VI is an elevation in cross section along the line 6—6 in Figure IV in the direction as shown by the arrows.

Similar reference characters refer to similar parts throughout in the several views of the drawings.

Turning now to Figure I there is shown at 10 the forward section of a motor vehicle frame having mounted thereon the two fender brackets 11 and 12 by means of bolts such as 13 passing throughout the forward ends of the fender brackets 11 and 12 having on their under surfaces a tubular cross member 14 of substantially rectangular cross section by means of the screws such as 15, the manner of attachment of the tubular cross member 14 to the brackets 11 and 12 by the screws 15 is more clearly shown in Figure V. A series of links such as 16 are swiveled from the forward side of the tubular cross member 14 by rivets such as 18 and a series of parallel links such as 17 are similarly attached to the rear side of the tubular cross member 14, the arrangement of these parallel links can be more clearly understood by looking at the front elevation of the fender shown in Figure IV. The lower ends of the left hand series of links 16 are fastened together by a bar 19, all joints in the linkage formed by the parallel links 16, the bar 19 and the tubular cross member 14 are made so that the linkage may be freely swung to the left or right from the position shown in Figure IV the movement taking place in the plane of the paper as shown in Figure IV. As the fender linkage consists of two identical parts one only will be mentioned in the description of the fender hereinafter. Mounted upon the tubular cross member 14 at the center of its upper side is the solenoid 20 the movable core of which is made in two parts such as 21 and 22 in Figure III. The winding of the solenoid 20 is made in three parts so that by suitable connections with the source of energy the two outside sections 23 and 24 may be energized simultaneously thus tending to cause the respective movable cores 22 and 21 to move outward from the center of the solenoid to the respective ends of the solenoid and upon the end sections 23 and 24 of the solenoid 20 being disconnected from the source of electrical energy and the center section 25 being connected therewith the movable cores 21 and 22 will tend to approach each other in the center section of the solenoid 20.

Turning now to Figure IV it will be seen that the middle vertical link 16 of the left hand fender linkage is extended above its fulcrum on the tubular cross member 14 and is bent to the right at an angle of 45° with respect to the rest of the link and also is offset from the plane in which the left hand linkage operates so as to facilitate the connection of the left hand movable core of the solenoid 20 therewith by means of the connecting links 26 and 27 and the pins 28 and 29, this offset is clearly seen in Figue III. The extreme left hand vertical link of the left hand fender linkage as shown in Figure IV is provided with an extension above the point of attachment of the link to the tubular cross member 14 which is at an angle of 45° with the portion of the link laying below its point of attachment and secured in the upper end of this extension is a stud 30 over which is hooked one end of the spiral spring 31, the other end of which is hooked over a similar stud 32 affixed in the tubular cross member 14. A non-magnetic stopping piece 33 is pressed into the center of the solenoid 20 which serves to prevent the movable cores 22 and 21 from coming into contact with each other when they approach the center of the solenoid 20, the necessity of which will be seen from the position of the spiral spring 31 as shown in Figure IV. As the center line of the spiral spring 31 lies above the point of support of the left hand vertical link 16 to which it is attached, there is exerted upon the upper end of this link a force which has a tendency to cause right handed rotation about the point of attachment of the link 16 to the tubular cross member 14 and if there were no stop to the limit of the inward movement of the movable core 22 into the solenoid 20 the left hand fender linkage would swing out to the left permitting the movable core 22 to come into contact with the movable core 21. A flat spring 42 bent to the shape as shown in the cross section in Figure V is riveted to the bottom of the tubular cross member 14 by rivets such as 43, tends to prevent rattling of the fender linkage when the fender is in the retracted position by the wedging action exerted by it against the bar 19.

Turning now to Figure III it will be seen that one end of the solenoid windings of the sections 23, 24 and 25 of the solenoid 20 are connected together to a common conductor which is connected at its other end to a source of electrical energy such as the battery usually provided for starting lighting and ignition 34, the other terminal of the battery being grounded on the frame of the vehicle. The other two ends of the windings of the solenoid sections 23 and 24 are connected to a common conductor 35 which at its other extremity is connected with the left hand terminal 36 of the controlling switch 37 which is mounted upon the steering column 38 and the remaining end of the winding of the middle solenoid section 25 is connected to the right hand terminal 39 of the switch 37 by the conductor 40. The switch lever 41 of the switch 37 is grounded on the steering column 38 which is in turn grounded upon the frame of the vehicle 10 thus being in electrical connection with the battery 34.

Let us consider now the vehicle approaching an object which lies in the path of the vehicle and which the operator of said vehicle is unable to avoid striking. Under these conditions the operator may extend the fender or not as he sees fit though it is probable that the average operator would extend the fender before any sort of a collision whatsoever. To extend the fender the operator pushes the switch lever 41 forward until it engages with the terminal 36 thus establishing an electrical circuit through the conductor 35 to the center section 25 of the solenoid 20, a conductor 33 and the battery 34 the circuit returning through the grounded frame to the switch lever 41 where it is grounded upon the steering column 38. In Figure III and Figure IV the fender is shown in an extended position by the full lines but the dotted lines in Figure IV show the position assumed by the fender linkage when in the retracted position and it will be seen that the center line of the spiral spring 31 then falls below the point of attachment of the left hand vertical link 16 thus the spring 31 exerts a tendency for left hand rotation of the pin 30 and the left hand vertical link 16 about its point of attachment to the tubular cross member 14 which tends to keep the linkage in the retracted position until some force is applied to the linkage which will overcome that force exerted by the spring 31. The center section 25 of the solenoid 20 having been placed in electrical connection with the battery 34 and the resulting flow of current having energized the center section 25 the movable cores 21 and 22 will be strongly attracted towards the center of the solenoid 20 and the parts having been so proportioned that this magnetic attraction of the movable cores 21 and 22 will be more than sufficient to overcome the spring 31 and moving towards each other and the center of the solenoid 20 will draw the upper end of the center vertical link to the right by reason of the connecting links 26 and 27 attached to the movable core 22 by the pin 29 and to the center vertical link by the pin 28.

The movable core 22 continuing to move toward the center of the solenoid 20 and the left hand fender linkage swinging downward to the extended position from the retracted position the center line of the spring 31 moves upward until it passes upward beyond the center line of attachment of the left hand vertical link 16 thus the retarding force exerted by the spring 31 against the movement of the left hand fender linkage will become zero and finally becomes an increasing force aiding the solenoid 20 thus after the initial locking action of the spiral spring 31 having been overcome the fender linkage will move with increasing rapidity due to the increased force available to overcome the inertia of the moving parts until the movable core 22 comes up against the stop 33 at the center of the solenoid 20 when all motion of the parts having ceased the fender will be in the extended position substantially as shown in Figure IV. As the fender proper consists of two identical separate sets of linkages in the action above described it is to be understood that although the motion of one only has been described that the other linkage simultaneously has been extending itself in a like manner. Upon the fender being fully extended it will be seen that the center line of the spring 31 now falls at an appreciable distance above the point of support of the left hand vertical link 16 to the tubular cross member 14 thus exerting a force whose tendency is to cause the left hand fender linkage to swing further to the left but which is restrained in taking place by reason of the movable core 22 having brought up firmly against the stop 33 at the middle of the solenoid 20. The fender now coming into contact with the object which lies in the path of the vehicle it will prevent said object from being run over by the forward wheels of the vehicle or from passing under the vehicle and also due to the inherent springiness of the material from which the vertical links 16 and 17 of which the fender is constructed there is a tendency to throw the object forward a ways after the first blow thus affording an opportunity for the operator of the vehicle to reduce his speed and eventually stop the forward motion of the vehicle. The fender having filled the use for which it has been designed and the operator desiring to bring the fender back into the normal retracted position it is only necessary for the operator to draw the switch lever 41 towards him until electrical contact is established with the switch terminal 39 which results in the closed electrical circuit being formed through the two outside sections 23 and 24 of the solenoid 20 and the battery 34 by means of the connecting conductors 35 and 34' and the grounded section of the circuit. The outside sections 23 and 24 of the solenoid 20 having become energized, the movable core 22 tends to move away from its position against the stop 33 under the urge of the magnetic pull exerted by the outside section 24 of the solenoid 20 and in transmitting this force to the middle vertical link of the left hand fender linkage by means of the pin 29 passing through the connecting links 26 and 27 and the movable core 22 and the pin 28 passing through the end of the middle vertical link 16, the bar 19 will swing to the right and as the vertical links revolve about their points of attachment to the tubular cross member 14 in an anticlockwise direction the center line of the spring 31 will approach and finally pass beyond the center of the point of attachment of the left hand vertical link 16 until finally the left hand fender linkage having swung up to the right to the limit of its travel thus the center line of the spring will fall appreciably below the point of attachment of the left hand vertical link of the tubular cross member 14 and thus the force exerted by the spring 31 will tend to keep the left hand fender linkage in the retracted position as shown by the dotted lines.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim—

1. In fender construction for motor vehicles, in combination, a fender comprising a plurality of pivotally mounted members and means adapted to positively engage said members and swing said members simultaneously and substantially in the same plane into a position in advance of the wheel of the vehicle.

2. In fender construction for motor vehicles, in combination, a plurality of pivotally mounted interconnected members mounted to swing in the direction transverse of the vehicle and means adapted to positively engage one of said members and swing said members downwardly into a position in advance of the front wheel of the vehicle.

3. In fender construction for motor vehicles, in combination, a plurality of collapsible frames and driven means adapted to extend said frames simultaneously into a position in advance of the front wheels of the vehicles.

4. In fender construction for motor vehicles, in combination, a plurality of swing frames mounted to swing transversely of the vehicle, driven means adapted to swing said frames toward one another into inoperative position and downwardly away from one another into operative position.

5. In fender construction for motor vehicles, in combination, a fender comprising a plurality of normally folded members, an electromagnet adapted to be connected with a source of current supply and means actuated by said electromagnet adapted to positively engage said fender and move said fender into operative position.

6. In fender construction for motor vehicles, in combination, a fender, an electromagnet adapted to be connected with a source of current supply and means actuated by said electromagnet adapted to move said fender into retracted ineffective position.

7. In fender construction for motor vehicles, in combination, a fender, electrically actuated means adapted to move said fender into an operative position before wheels or inoperative retracted position and manually controlled means adjacent to driver controlling said electric means to determine the position of said fender.

8. In fender construction for motor vehicles, in combination, a fender comprising a pivoted frame adapted normally to assume an inoperative position upon a motor vehicle, means adapted to swing said frame transversely of the vehicle into operative position before the wheels, and resilient means adapted alternatively to tend to hold said fender in operative position or in inoperative position.

9. In fender construction for motor vehicles, in combination, a fender, means adapted to move said fender into inoperative position and means adapted automatically to hold said fender against rattling upon being moved into inoperative position.

10. In fender construction for motor vehicles, in combination, a plurality of separate movable frames mounted in front of a vehicle and means adapted to move said frames into overlapping inoperative position.

11. In fender construction for motor vehicles, in combination, a member mounted transversely on the forward part of a vehicle, a fender mounted on the forward side of said member, a fender mounted on the rear side of said member, and means adapted to swing said fenders substantially transversely of the vehicle.

12. In fender construction for motor vehicles, in combination, a fender comprising a plurality of substantially parallel laterally swinging frames and means extending into the space between said frames when said fender is in operative position.

13. In fender construction for motor vehicles, in combination, a fender adapted to drop by the force of gravity into operative position before the wheels of a vehicle and electrically driven means adapted to complement the force of gravity and force said fender into operative position.

14. In fender construction for motor vehicles, in combination, a fender, electrical means adapted to move said fender into operative position, and resilient means adapted to hold said fender in operative position.

15. In fender construction for motor vehicles, in combination, a fender, electrical means adapted to move said fender into inoperative position, and resilient means adapted to hold said fender in inoperative position.

16. In fender construction for motor vehicles, in combination, a fender, means adapted to move said fender into inoperative position, and resilient means adapted automatically to hold said fender against rattling upon being moved into inoperative position.

Signed at Stamford, in the county of Fairfield and State of Connecticut.

ROBERT S. BLAIR.